United States Patent
Condrey

(10) Patent No.: US 11,351,466 B2
(45) Date of Patent: Jun. 7, 2022

(54) SYSTEM AND METHOD FOR CUSTOMIZING A REPLAY OF ONE OR MORE GAME EVENTS IN A VIDEO GAME

(71) Applicant: ACTIVISION PUBLISHING, INC., Santa Monica, CA (US)

(72) Inventor: Michael Condrey, San Carlos, CA (US)

(73) Assignee: ACTIVISION PUBLISHING, INC., Santa Monica, CA (US)

( * ) Notice: Subject to any disclaimer, the term of this patent is extended or adjusted under 35 U.S.C. 154(b) by 392 days.

(21) Appl. No.: 14/561,801

(22) Filed: Dec. 5, 2014

(65) Prior Publication Data

US 2016/0158656 A1    Jun. 9, 2016

(51) Int. Cl.
    *A63F 13/86*     (2014.01)
    *A63F 13/63*     (2014.01)

(52) U.S. Cl.
    CPC .............. *A63F 13/86* (2014.09); *A63F 13/63* (2014.09)

(58) Field of Classification Search
    CPC ......... A63F 13/86; A63F 13/63; A63F 13/497
    USPC .......................................................... 463/31
    See application file for complete search history.

(56) References Cited

U.S. PATENT DOCUMENTS

| | | |
|---|---|---|
| 5,031,089 A | 7/1991 | Liu |
| 5,442,569 A | 8/1995 | Osano |
| 5,530,796 A | 6/1996 | Wang |
| 5,535,276 A | 7/1996 | Ganesan |
| 5,539,883 A | 7/1996 | Allon |
| 5,561,736 A | 10/1996 | Moore |
| 5,563,946 A | 10/1996 | Cooper |
| 5,630,129 A | 5/1997 | Wheat |
| 5,685,775 A | 11/1997 | Bakoglu |
| 5,706,507 A | 1/1998 | Schloss |
| 5,708,764 A | 1/1998 | Borrel |
| 5,736,985 A | 4/1998 | Lection |
| 5,736,990 A | 4/1998 | Barrus |
| 5,737,416 A | 4/1998 | Cooper |
| 5,745,678 A | 4/1998 | Herzberg |
| 5,762,552 A | 6/1998 | Vuong |
| 5,768,511 A | 6/1998 | Galvin |
| 5,774,668 A | 6/1998 | Choquier |

(Continued)

FOREIGN PATENT DOCUMENTS

| | | |
|---|---|---|
| AU | 768367 | 3/2004 |
| AU | 2005215048 | 10/2011 |

(Continued)

OTHER PUBLICATIONS

Surelya, "CS:Go Winter Update Adds Killer Replay", MMOs.com, published Dec. 13, 2015 retrieved from Internet URL <https://mmos.com/news/csgo-winter-update-adds-killer-replay>. (Year: 2015).*

(Continued)

*Primary Examiner* — Jay Trent Liddle
*Assistant Examiner* — Ryan Hsu
(74) *Attorney, Agent, or Firm* — Novel IP

(57) ABSTRACT

A system and method for customizing a replay of one or more game events in a video game is provided. During a gameplay session, a trigger event is detected prompting a replay of the trigger event in-game. One or more system-defined customization templates and/or user-defined customization templates may be applied to customize the trigger event replay.

19 Claims, 5 Drawing Sheets

(56) References Cited

U.S. PATENT DOCUMENTS

| | | |
|---|---|---|
| 5,796,393 A | 8/1998 | MacNaughton |
| 5,825,877 A | 10/1998 | Dan |
| 5,835,692 A | 11/1998 | Cragun |
| 5,860,137 A | 1/1999 | Raz |
| 5,875,296 A | 2/1999 | Shi |
| 5,878,233 A | 3/1999 | Schloss |
| 5,883,628 A | 3/1999 | Mullaly |
| 5,884,024 A | 3/1999 | Lim |
| 5,900,879 A | 5/1999 | Berry |
| 5,903,266 A | 5/1999 | Berstis |
| 5,903,271 A | 5/1999 | Bardon |
| 5,908,469 A | 6/1999 | Botz |
| 5,911,045 A | 6/1999 | Leyba |
| 5,920,325 A | 7/1999 | Morgan |
| 5,923,324 A | 7/1999 | Berry |
| 5,938,722 A | 8/1999 | Johnson |
| 5,944,824 A | 8/1999 | He |
| 5,963,915 A | 10/1999 | Kirsch |
| 5,969,724 A | 10/1999 | Berry |
| 5,977,979 A | 11/1999 | Clough |
| 5,990,888 A | 11/1999 | Blades |
| 6,008,848 A | 12/1999 | Tiwari |
| 6,009,455 A | 12/1999 | Doyle |
| 6,014,145 A | 1/2000 | Bardon |
| 6,021,268 A | 2/2000 | Johnson |
| 6,025,839 A | 2/2000 | Schell |
| 6,049,819 A | 4/2000 | Buckle |
| 6,058,266 A | 5/2000 | Megiddo |
| 6,059,842 A | 5/2000 | Dumarot |
| 6,069,632 A | 5/2000 | Mullaly |
| 6,081,270 A | 6/2000 | Berry |
| 6,081,271 A | 6/2000 | Bardon |
| 6,088,727 A | 7/2000 | Hosokawa |
| 6,091,410 A | 7/2000 | Lection |
| 6,094,196 A | 7/2000 | Berry |
| 6,098,056 A | 8/2000 | Rusnak |
| 6,101,538 A | 8/2000 | Brown |
| 6,104,406 A | 8/2000 | Berry |
| 6,111,581 A | 8/2000 | Berry |
| 6,134,588 A | 10/2000 | Guenthner |
| 6,141,699 A | 10/2000 | Luzzi |
| 6,144,381 A | 11/2000 | Lection |
| 6,148,328 A | 11/2000 | Cuomo |
| 6,179,713 B1 | 1/2001 | James |
| 6,185,614 B1 | 2/2001 | Cuomo |
| 6,201,881 B1 | 3/2001 | Masuda |
| 6,222,551 B1 | 4/2001 | Schneider |
| 6,271,842 B1 | 8/2001 | Bardon |
| 6,271,843 B1 | 8/2001 | Lection |
| 6,282,547 B1 | 8/2001 | Hirsch |
| 6,308,208 B1 | 10/2001 | Jung |
| 6,311,206 B1 | 10/2001 | Malkin |
| 6,314,465 B1 | 11/2001 | Paul |
| 6,330,281 B1 | 12/2001 | Mann |
| 6,334,141 B1 | 12/2001 | Varma |
| 6,336,134 B1 | 1/2002 | Varma |
| 6,337,700 B1 | 1/2002 | Kinoe |
| 6,345,287 B1 | 2/2002 | Fong |
| 6,349,091 B1 | 2/2002 | Li |
| 6,351,775 B1 | 2/2002 | Yu |
| 6,353,449 B1 | 3/2002 | Gregg |
| 6,356,297 B1 | 3/2002 | Cheng |
| 6,370,560 B1 | 4/2002 | Robertazzi |
| 6,393,467 B1 | 5/2002 | Potvin |
| 6,411,312 B1 | 6/2002 | Sheppard |
| 6,418,462 B1 | 7/2002 | Xu |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,466,550 B1 | 10/2002 | Foster |
| 6,469,712 B1 | 10/2002 | Hilpert, Jr. |
| 6,473,085 B1 | 10/2002 | Brock |
| 6,473,597 B1 | 10/2002 | Johnson |
| 6,499,053 B1 | 12/2002 | Marquette |
| 6,505,208 B1 | 1/2003 | Kanevsky |
| 6,509,925 B1 | 1/2003 | Dermler |
| 6,525,731 B1 | 2/2003 | Suits |
| 6,539,415 B1 | 3/2003 | Mercs |
| 6,549,933 B1 | 4/2003 | Barrett |
| 6,567,109 B1 | 5/2003 | Todd |
| 6,567,813 B1 | 5/2003 | Zhu |
| 6,574,477 B1 | 6/2003 | Rathunde |
| 6,580,981 B1 | 6/2003 | Masood |
| 6,601,084 B1 | 7/2003 | Bhaskaran |
| 6,618,751 B1 | 9/2003 | Challenger |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,699,127 B1 | 3/2004 | Lobb |
| 6,717,600 B2 | 4/2004 | Dutta |
| 6,734,884 B1 | 5/2004 | Berry |
| 6,765,596 B2 | 7/2004 | Lection |
| 6,781,607 B1 | 8/2004 | Benham |
| 6,801,930 B1 | 10/2004 | Dionne |
| 6,819,669 B2 | 11/2004 | Rooney |
| 6,832,239 B1 | 12/2004 | Kraft |
| 6,836,480 B2 | 12/2004 | Basso |
| 6,845,389 B1 | 1/2005 | Sen |
| 6,886,026 B1 | 4/2005 | Hanson |
| 6,941,236 B2 | 9/2005 | Huelsbergen |
| 6,948,168 B1 | 9/2005 | Kuprionas |
| RE38,865 E | 11/2005 | Dumarot |
| 6,970,929 B2 | 11/2005 | Bae |
| 6,993,596 B2 | 1/2006 | Hinton |
| 7,006,616 B1 | 2/2006 | Christofferson |
| 7,028,296 B2 | 4/2006 | Irfan |
| 7,062,533 B2 | 6/2006 | Brown |
| 7,089,266 B2 | 8/2006 | Stolte |
| 7,124,071 B2 | 10/2006 | Rich |
| 7,139,792 B1 | 11/2006 | Mishra |
| 7,143,409 B2 | 11/2006 | Herrero |
| 7,159,217 B2 | 1/2007 | Pulsipher |
| 7,185,067 B1 | 2/2007 | Viswanath |
| 7,209,137 B2 | 4/2007 | Brokenshire |
| 7,230,616 B2 | 6/2007 | Taubin |
| 7,249,123 B2 | 7/2007 | Elder |
| 7,263,511 B2 | 8/2007 | Bodin |
| 7,287,053 B2 | 10/2007 | Bodin |
| 7,305,438 B2 | 12/2007 | Christensen |
| 7,308,476 B2 | 12/2007 | Mannaru |
| 7,353,295 B1 | 4/2008 | Crow |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B2 | 11/2008 | Cox |
| 7,467,180 B2 | 12/2008 | Kaufman |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,515,136 B1 | 4/2009 | Kanevsky |
| 7,525,964 B2 | 4/2009 | Astley |
| 7,548,948 B2 | 6/2009 | Klemets |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,590,984 B2 | 9/2009 | Kaufman |
| 7,596,596 B2 | 9/2009 | Chen |
| 7,640,587 B2 | 12/2009 | Fox |
| 7,667,701 B2 | 2/2010 | Leah |
| 7,698,656 B2 | 4/2010 | Srivastava |
| 7,702,784 B2 | 4/2010 | Berstis |
| 7,714,867 B2 | 5/2010 | Doi |

(56) References Cited

U.S. PATENT DOCUMENTS

| | | |
|---|---|---|
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,773,087 B2 | 8/2010 | Fowler |
| 7,774,407 B2 | 8/2010 | Daly |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,847,799 B2 | 12/2010 | Taubin |
| 7,856,469 B2 | 12/2010 | Chen |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | Finn |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,550,920 B1 | 10/2013 | Allen |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,005,030 B2 | 4/2015 | Laakkonen |
| 9,005,036 B2 | 4/2015 | Laakkonen |
| 9,083,654 B2 | 7/2015 | Dawson |
| 9,152,914 B2 | 10/2015 | Haggar |
| 9,199,165 B2 | 12/2015 | Zahn |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |

(56) References Cited

U.S. PATENT DOCUMENTS

| | | | |
|---|---|---|---|
| 9,403,090 B2 * | 8/2016 | Harris | A63F 13/12 |
| 9,474,973 B2 | 10/2016 | Perry | |
| 9,525,746 B2 | 12/2016 | Bates | |
| 9,583,109 B2 | 2/2017 | Kurata | |
| 9,621,622 B2 | 4/2017 | Ueda | |
| 9,630,097 B2 | 4/2017 | Paradise | |
| 9,641,592 B2 | 5/2017 | Thompson | |
| 9,682,324 B2 | 6/2017 | Bansi | |
| 9,764,244 B2 | 9/2017 | Bansi | |
| 9,789,406 B2 | 10/2017 | Marr | |
| 9,808,722 B2 | 11/2017 | Kawachiya | |
| 2002/0007317 A1 | 1/2002 | Callaghan | |
| 2002/0010776 A1 | 1/2002 | Lerner | |
| 2002/0023159 A1 | 2/2002 | Vange | |
| 2002/0056006 A1 | 5/2002 | Vange | |
| 2002/0065870 A1 | 5/2002 | Baehr-Jones | |
| 2002/0078192 A1 | 6/2002 | Kopsell | |
| 2002/0107918 A1 | 8/2002 | Shaffer | |
| 2002/0124137 A1 | 9/2002 | Ulrich | |
| 2003/0008712 A1 | 1/2003 | Poulin | |
| 2003/0037131 A1 | 2/2003 | Verma | |
| 2003/0055892 A1 | 3/2003 | Huitema | |
| 2003/0056002 A1 | 3/2003 | Trethewey | |
| 2003/0084172 A1 | 5/2003 | Dejong | |
| 2003/0084302 A1 | 5/2003 | De | |
| 2003/0110399 A1 | 6/2003 | Rail | |
| 2003/0135621 A1 | 7/2003 | Romagnoli | |
| 2003/0149781 A1 | 8/2003 | Yared | |
| 2003/0163733 A1 | 8/2003 | Barriga-Caceres | |
| 2003/0177187 A1 | 9/2003 | Levine | |
| 2004/0014514 A1 | 1/2004 | Yacenda | |
| 2004/0073773 A1 | 4/2004 | Demjanenko | |
| 2004/0103079 A1 | 5/2004 | Tokusho | |
| 2004/0210627 A1 | 10/2004 | Kroening | |
| 2004/0228291 A1 | 11/2004 | Huslak | |
| 2004/0244006 A1 | 12/2004 | Kaufman | |
| 2005/0015571 A1 | 1/2005 | Kaufman | |
| 2005/0246711 A1 | 11/2005 | Berstis | |
| 2007/0060359 A1 | 3/2007 | Smith | |
| 2007/0294089 A1 * | 12/2007 | Garbow | A63F 13/12 705/26.1 |
| 2008/0046956 A1 | 2/2008 | Kulas | |
| 2008/0139301 A1 | 6/2008 | Holthe | |
| 2008/0270605 A1 | 10/2008 | Berstis | |
| 2008/0301405 A1 | 12/2008 | Kaufman | |
| 2009/0082095 A1 | 3/2009 | Walker | |
| 2009/0113448 A1 | 4/2009 | Smith | |
| 2009/0131177 A1 | 5/2009 | Pearce | |
| 2009/0147010 A1 * | 6/2009 | Russell | G11B 27/034 345/473 |
| 2009/0258708 A1 | 10/2009 | Figueroa | |
| 2009/0298585 A1 | 12/2009 | Cannon | |
| 2010/0153653 A1 | 6/2010 | El-Mahdy | |
| 2010/0167816 A1 | 7/2010 | Perlman | |
| 2011/0151971 A1 | 6/2011 | Altshuler | |
| 2012/0100910 A1 | 4/2012 | Eichorn | |
| 2012/0289346 A1 | 11/2012 | Van Luchene | |
| 2014/0031121 A1 * | 1/2014 | Kern | A63F 13/355 463/33 |
| 2014/0194211 A1 * | 7/2014 | Chimes | A63F 13/79 463/43 |
| 2014/0221084 A1 | 8/2014 | Morrison, III | |
| 2014/0235336 A1 * | 8/2014 | Morimoto | A63F 13/12 463/31 |
| 2014/0344725 A1 | 11/2014 | Bates | |
| 2014/0370979 A1 | 12/2014 | Zahn | |
| 2015/0141140 A1 * | 5/2015 | Lampe | H04N 21/8549 463/31 |
| 2015/0224395 A1 * | 8/2015 | Trombetta | A63F 13/497 463/24 |
| 2015/0224399 A1 * | 8/2015 | Melo | A63F 13/63 463/29 |
| 2015/0375102 A1 | 12/2015 | George | |
| 2016/0171835 A1 | 6/2016 | Washington | |
| 2016/0180647 A1 | 6/2016 | Webb | |
| 2016/0191671 A1 | 6/2016 | Dawson | |
| 2016/0214012 A1 | 7/2016 | Nishikawa | |
| 2017/0014718 A1 | 1/2017 | Ceraldi | |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0940960 A1 | 9/1999 |
| EP | 0998091 A2 | 5/2000 |
| EP | 1020804 A2 | 7/2000 |
| EP | 0627728 B1 | 9/2000 |
| EP | 1089516 A2 | 4/2001 |
| EP | 0717337 B1 | 8/2001 |
| EP | 1207694 A2 | 5/2002 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | H1198134 A | 4/1999 |
| JP | H11191097 A | 4/1999 |
| JP | 11191097 | 7/1999 |
| JP | 3033956 B2 | 4/2000 |
| JP | 3124916 B2 | 1/2001 |
| JP | 3177221 B2 | 6/2001 |
| JP | 2001204973 A | 7/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| KR | 20020038229 A | 5/2002 |
| KR | 20030039019 A | 5/2003 |
| MY | 117864 A | 8/2004 |
| SG | 55396 | 12/1998 |
| TW | 424213 | 3/2001 |
| TW | 527825 | 4/2003 |
| TW | 200836091 | 9/2008 |

(56) References Cited

FOREIGN PATENT DOCUMENTS

| | | |
|---|---|---|
| TW | 200937926 | 9/2009 |
| TW | 201002013 | 1/2010 |
| TW | 201009746 | 3/2010 |
| TW | 201024997 | 7/2010 |
| TW | 201028871 | 8/2010 |
| WO | 9642041 A2 | 12/1996 |
| WO | 9900960 A1 | 1/1999 |
| WO | 0203645 A2 | 1/2002 |
| WO | 2002073457 | 9/2002 |
| WO | 20020087156 | 10/2002 |
| WO | 03049459 A1 | 6/2003 |
| WO | 03058518 A2 | 7/2003 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

OTHER PUBLICATIONS

Office Action dated Jun. 26, 2014 for U.S. Appl. No. 13/731,661.
Planet Unreal, "Unreal Tournament Game Guide", game released Nov. 1999 with earliest article cmment on Sep. 6, 2007, IGN Entertainment, <http://planetunreal.gamespy.com/View.php?view=UTGameInfo.Detail&id=28&game=6><http://planetunreal.gamespy.com/View.php?view=UTGameInfo.Detail&id=1&game=6>.
EverQuest Wiki, "EverQuest Classes", Aug. 19, 2011, <http://everquest.wikia.com/wiki/Classes?oldid=3773>.
Office Action dated Nov. 10, 2014 for U.S. Appl. No. 13/731,661.
Applicant Initiated Interview Summary dated Feb. 10, 2015 for U.S. Appl. No. 13/731,661.
Notice of Allowance dated Mar. 26, 2018 for U.S. Appl. No. 13/731,661 (pp. 1-8).
Office Action dated Mar. 13, 2018 for U.S. Appl. No. 14/919,358 (pp. 1-11).
Office Action dated Mar. 21, 2018 for U.S. Appl. No. 14/919,430 (pp. 1-22).
Office Action dated Mar. 9, 2018 for U.S. Appl. No. 14/919,444 (pp. 1-16).
Office Action dated Oct. 6, 2017 for U.S. Appl. No. 15/136,334; (pp. 1-10).
Office Action dated Oct. 6, 2017 for U.S. Appl. No. 15/136,386; (pp. 1-9).
Kormann et al., "Risks of the Passport Single Signon Protocol" < 9th Intl. WWW Conf., May 15, 2000.
Syverson, "Limitations on design principles for public key protocols", Proc. of 1996 IEEE Symposium on Security and Privacy, pp. 62-72, May 6, 1996.
Abadi et al., "Prudent Engineering Practice for Cryptogrphic Protocols", Proc. of 1994 IEEE Computer Society Symposium on Research in Security and Privacy, pp. 122-136, May 16, 1994.
Supplementary European Search from the European Patent Office for EP05723458.5, dated Jul. 19, 2010.
International Search Report as Published as WO2005/079538 in corresponding international application No. PCT/US2005/005550, dated Jul. 5, 2006.

Duong et al.; "A dynamic load sharing algorithm for massivly multiplayer online games" published Sep. 28, 2003-Oct. 1, 2003. http://ieeexplore.IEEE.org/iel5/8945/28322/01266179.pdf?tp=&arnumber-=1266179&isnumber=28322http://ieeexplore.ieee.org/xpl/absprintf.jsp?arnumb- er=1266179.
"A multi-server architecture for distributed virtual walkthrough" http://delivery.acm.org/10.1145/590000/585768/p163-ng.pdf?key1=585768&key-2=0554824911&coll=GUIDE&dl=GUIDE&CFID=41712537&CFTOKEN=50783297.
Mauve, M., Fischer, S., and Widmer, J. 2002. A generic proxy system for networked computer games. In Proceedings of the 1st Workshop on Network and System Support for Games (Braunschweig, Germany, Apr. 16-17, 2002). NetGames '02. ACM, New York, NY, 25-28. DOI= http://doi.acm.org/10.1145/566500.566504.
IBM develope rWorks, OptimalGrid—autonomic computing on the Grid, James H. Kaufman; Tobin J. Lehman; Glenn Deen; and John Thomas, Jun. 2003.
IBM, Transcoding: Extending e-business to new environments, Britton et al., Sep. 22, 2000.
Lee et al., "A Self-Adjusting Data Distribution Mechanism for Multidimensional Load Balancing in Multiprocessor-Based Database Systems," Information Systems vol. 19, No. 7, pp. 549-567, 1994.
Ma et al., "A Scalable Parallel Cell-Projection Volume Rendering Algorithm for Three-Dimensional Unstructured Data", IEEE 1997, pp. 1-10.
Feng et al., "A Parallel Hierarchical Radiosity Algorithm for Complex Scenes," Proceedings IEEE Symposium on Parallel Rendering (PRS) '97), IEEE Computer Society Technical Committee on Computer Graphics in cooperation with ACM SIGGRAPH pp. 71-79, 1997.
Hassen et al., "ATask- and Data-Parallel Programming Language Based on Shared Objects," ACM Transactions on Programming Languages and Systems, vol. 20, No. 6, Nov. 1998, pp. 1131-1170.
Andert, "A Simulation of Dynamic Task Allocation in a Distributed Computer System," Proceedings of the 1987 Winter Simulation Conference, 1987, pp. 1-9.
Office Action dated May 16, 2018 for U.S. Appl. No. 15/136,334 (pp. 1-12).
Office Action dated May 18, 2018 for U.S. Appl. No. 15/136,386 (pp. 1-11).
Notice of Allowance dated Jul. 12, 2018 for U.S. Appl. No. 13/731,661 (pp. 1-9).
Office ACtion dated Oct. 25, 2018 for U.S. Appl. No. 14/919,358 (pp. 1-11).
Notice of Allowance dated Nov. 1, 2018 for U.S. Appl. No. 14/919,430 (pp. 1-14).
Notice of Allowance dated Oct. 31, 2018 for U.S. Appl. No. 15/136,386 (pp. 1-7).
Notice of Allowance dated Nov. 13, 2018 for U.S. Appl. No. 14/919,444 (pp. 1-10).
Notice of Allowance dated Jan. 14, 2019 for U.S. Appl. No. 15/136,334 (pp. 1-7).
Derek Stanley, "What bitrate should I use when encoding my video? How do I optimize my video for the web?", Feb. 12, 2012, ezs3.com, <https://web.archive.Org/web/20120212171320/https://www.ezs3.com/public/What_bitrate_should_I_use_when_encoding_my_video_How_do_I_optimize_my_video_for_the_web.cfm>(Year: 2012).

\* cited by examiner

SYSTEM AND METHOD FOR CUSTOMIZING A REPLAY OF ONE OR MORE GAME EVENTS IN A VIDEO GAME

FIELD OF THE INVENTION

The invention relates generally to video games, and more particularly to a system and method for customizing a replay of one or more game events in a video game.

BACKGROUND OF THE INVENTION

In most video games, players typically control a character (e.g., an athlete, soldier, "rock-star," superhero, monster, animal, imaginary creature or beast, etc.) or object (e.g., race car, spaceship, etc.) to perform various game actions in order to accomplish a game event. For example, in a "shooter" game, a player may lead his or her character through a series of actions (e.g., tracking an opponent, positively identifying the opponent, aiming a gun at the opponent, and shooting the opponent) that comprise (or culminate in) a game event (e.g., the killing of the opponent). Depending on the particular video game, one or more game events may be necessary to reach a certain status, level, goal, or other game objective.

In some video games, one or more game events may be replayed for a player (and/or a number of other players) in certain instances. As an example, in "Call of Duty®," the first-person shooter video game franchise published by Activision Publishing, Inc., a "KillCam" is utilized to show a player his or her death, after-the-fact, from the perspective of the killer. The KillCam is useful for, among other things, identifying how a player was killed, and locating enemy positions.

It may be desirable to "replay" one or more game events for a player and/or a number of other players (e.g., in a multiplayer game) for a variety of reasons. For instance, it may be educational for a player to view one or more past actions or events to understand how or why they were successful in accomplishing a particular game objective, or to likewise appreciate why they may have been unsuccessful in failing to accomplish an objective. Further, in a multiplayer game, it may provide a winning or victorious player with an opportunity to boast or brag to a defeated opponent by making them view and relive their defeat or demise again.

While the replay of game events enables players to view and learn from their actions (and the actions of others) in gameplay sessions in which they are involved, current replay functionality does not appear to allow for player interaction or customization. These and other drawbacks exist.

SUMMARY OF THE INVENTION

The invention addressing these and other drawbacks relates to a system and method for customizing a replay of one or more game events in a video game.

As used herein, a "game event" (or event) may comprise an occurrence or incident during gameplay. An event may further include one or more "game actions" (or actions) that comprise the event. As a non-limiting example, in a shooter game, killing an enemy combatant (typically a game opponent or competitor) may comprise a game event. Tracking the enemy combatant, positively identifying the enemy combatant, aiming a gun at the enemy combatant, and pulling the trigger are non-limiting examples of actions that may comprise the game event. In some implementations, depending on the particular video game, one or more game events may be necessary to reach a certain status, level, goal, or other game objective associated with gameplay, or to access or "unlock" certain in-game benefits (extra equipment, special powers, etc.). For instance, continuing with the "shooter" example, a certain number or type of enemy combatants may have to be killed by the player (either alone or in cooperation with other players) in order to reach, access, or experience a different facet of gameplay.

While aspects of the invention may be described herein with reference to various game levels or modes, characters, roles, game items, etc. associated with a "shooter" game, it should be appreciated that any such examples are for illustrative purposes only, and are not intended to be limiting. The system and method described in detail herein may be used in any genre of video game, without limitation. Additionally, while aspects of the invention may be further described with reference to multiplayer video games, it should be recognized that the features and functionality described herein are equally applicable to a single player video game.

According to an aspect of the invention, one or more game events may be defined as trigger events for a particular video game. When a trigger event occurs during gameplay, an in-game replay of one or more actions comprising the trigger event may occur as explained in greater detail below. Trigger events may be system-defined (e.g., defined by the game logic) or user-defined (e.g., through one or more user interfaces prior to the commencement of a gameplay session). It should be appreciated that trigger events may be different for different video games. As an example, in a shooter game, a trigger event may comprise a kill in a match, or a last kill in any match, among other examples.

Once any trigger events have been defined, and a gameplay session begins, an event log engine may record gameplay state information. The gameplay state information may include user commands (e.g., click, touch, button presses, other inputs, etc.) and associated timing information of the commands for one or more players, audio/video information, positions and attributes of characters and objects, depiction of surrounding game environment and conditions, and any other type of game state information that may be used to recreate the game state for any given time or period of time of a gameplay session. The event log engine may capture gameplay state information continuously, or in predetermined segments, and the captured gameplay state information may be stored in one or more databases.

According to an aspect of the invention, gameplay may be monitored in real-time for the detection of a trigger event (e.g., by the event log engine, or other game logic). When a trigger event is detected, a replay engine may generate a replay of one or more of the game actions comprising the trigger event. As described herein, the "replay" of a trigger event comprises a playback of the actions comprising the trigger event, by the replay engine, based on the gameplay state information retrieved from the event log engine. The retrieved gameplay state information is used to generate (or recreate) the one or more actions and associated game state information for the trigger event.

In one implementation, gameplay state information may be retrieved from the event log engine for a predetermined time period that includes the trigger event, as well as a period of time before and/or after the trigger event. The predetermined time periods may vary depending on the nature of the trigger event, and may be defined by game logic and/or by users via one or more user interfaces. In an alternative implementation, gameplay state information may be retrieved from the event log engine relevant to a predetermined number of game actions that occurred prior to, and are associated with, the trigger event. For example, if a trigger event comprises a final kill in a match, the replay engine may retrieve gameplay state information for a predetermined number of predefined prior game actions including, for instance, identification of the enemy combatant, aiming of the weapon, and pulling of the trigger. Gameplay state information representing the final kill may also be retrieved along with gameplay state information for one or more actions occurring after the trigger event (e.g., the character raising his or her arms in victory, etc.). The predetermined number of associated game actions (for retrieval) occurring before, during, and/or after the trigger event may vary depending on the nature of the trigger event, and may be defined by game logic and/or by users via one or more user interfaces.

According to an aspect of the invention, a trigger event may be replayed for a player that caused the trigger event, for a player affected by the trigger event, and/or a number of other players that may have witnessed or were otherwise associated with the trigger event. A trigger event may also be replayed to depict a number of different player perspectives of the trigger event. The trigger event replay may also be provided to one or more players participating in the gameplay session.

In one implementation, gameplay may be paused while the trigger event is replayed. In an alternative implementation, gameplay may continue while the trigger event is replayed and the one or more players that view the replay may rejoin the game in-progress after the trigger event has been replayed. In some implementations, the trigger event may be replayed in a pop-up window or other on-screen display mechanism so as not to disrupt gameplay. In other implementations, the trigger event may be replayed on the full screen. In other words, a trigger event may be replayed to one or more players, in various screen displays (e.g., full screen, partial screen, in a separate window, etc.), from one or more different perspectives, while gameplay is either paused or allowed to continue. Various configurations may be implemented.

According to an aspect of the invention, replay of a trigger event may be customized in a variety of ways. For example, and as described in greater detail herein, graphical content, message content (e.g., text-based messages), audio content, video content, advertising content, and other types of customization content may be added to a replay of a trigger event to customize the replay.

In one implementation, a customization engine may apply customization content to a playback of a trigger event using system-defined customization templates and/or user-defined customization templates. The customization content available for any given trigger event may depend on a variety of factors including the video game, the type of game event that constitutes the trigger event, the intended audience for the trigger event replay, the perspective(s) from which replay of the trigger event may be viewed, and/or other factors.

According to an aspect of the invention, a player may select a system-defined customization template for one or more trigger events from a user interface prior to commencing gameplay. A player may further generate user-defined customization templates via a customization interface (described in detail below).

If a single customization template is selected or created by the user for a trigger event, or if game logic permits only one customization template to be applied during a trigger event replay (regardless of whether it is a system-selected or user-defined template), the template may be applied automatically and the trigger event replay may occur automatically when the trigger event is detected. If no customization templates are selected or created, a default customization template may be applied when a trigger event is detected, or no customization content may be added to a trigger event replay.

In certain implementations, a player may assign two or more customization templates (e.g., system-selected and/or user-defined templates) as being applicable to a given trigger event. For instance, in a shooter game, a player may create multiple customization templates to be used for a kill trigger event depending on a variety of factors including the identify of an opponent he kills in the game, the weapon that he uses to kill an opponent, the number of other game players that will see the trigger event replay, or other factors. In this implementation, each customization template may be assigned to a particular input used for gameplay (e.g., a controller button, mouse click, certain motion-based input, etc.). Accordingly, when a trigger event occurs, a player may be provided with an opportunity to activate the input corresponding to whatever customization template he or she wishes to apply in that moment based on the gameplay. For example, if PLAYER A kills a known friend that happens to be an opponent in a multiplayer game, he may select the button corresponding to a user-defined customization template that is perhaps more personalized in nature and includes more taunting since he knows his opponent. On the other hand, if PLAYER A kills an opponent that he does not know, he may select the button corresponding to a system-defined customization template that is more generic and not as personal (or harsh).

In those instances where a player may select from among multiple customization templates to apply to a trigger event replay, gameplay may pause for a predetermined time after the trigger event occurs to provide the player with an opportunity to select the input corresponding to the desired customization template. If no customization template is selected during this predetermined time period, a default customization template may be applied, or no customization content may be added to a trigger event replay. In another implementation, gameplay may continue while the customization template is selected by the player, and the trigger event is replayed. The one or more players that view the replay may rejoin the game in-progress after the trigger event has been replayed.

According to an aspect of the invention, a customization interface may be provided to enable a user to customize trigger event replays.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The invention described herein relates to a system and method for customizing a replay of one or more game events in a video game.

Exemplary System Architecture

Figure 1:
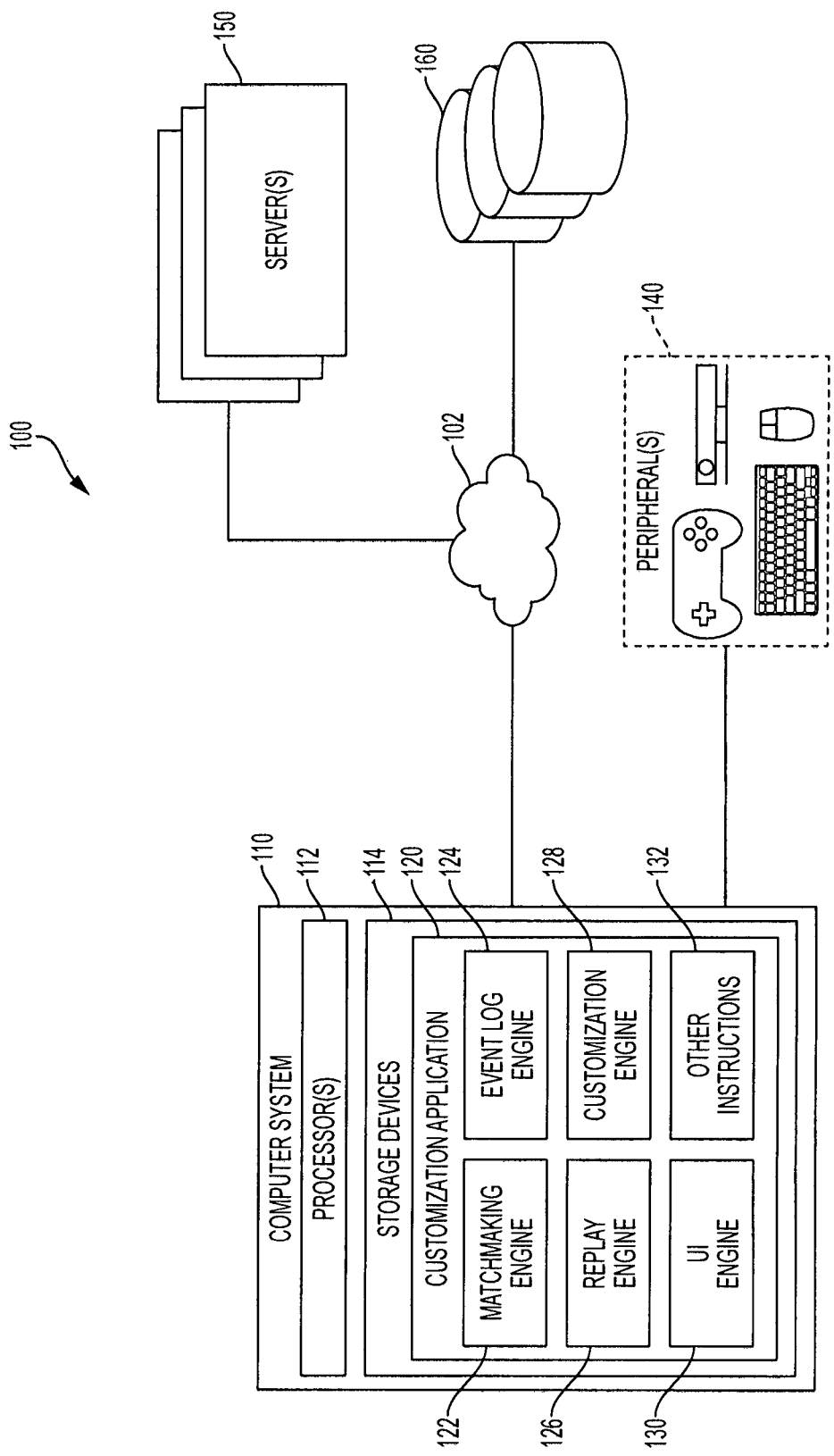
FIG. 1 illustrates an exemplary system for customizing a replay of one or more game events in a video game, according to an implementation of the invention.

FIG. 1 depicts an exemplary architecture of a system 100 which may include one or more computer systems 110, one or more servers 150, one or more databases 160, and/or other components, according to one implementation of the invention.

Computer System 110

Computer system 110 may be configured as a gaming console, a handheld gaming device, a personal computer (e.g., a desktop computer, a laptop computer, etc.), a smartphone, a tablet computing device, and/or other device that can be used to interact with an instance of a video game.

Computer system 110 may include one or more processors 112 (also interchangeably referred to herein as processors 112, processor(s) 112, or processor 112 for convenience), one or more storage devices 114 (which may store a customization application 120), one or more peripherals 140, and/or other components. Processors 112 may be programmed by one or more computer program instructions. For example, processors 112 may be programmed by customization application 120 and/or other instructions (such as gaming instructions used to instantiate the game).

Depending on the system configuration, customization application 120 (or portions thereof) may be part of a game application, which creates a game instance to facilitate gameplay. Alternatively or additionally, customization application 120 may run on a device such as a server 150 to customize a replay of one or more game events in a video game.

Customization application 120 may include instructions that program computer system 110. The instructions may include, without limitation, a matchmaking engine 122, an event log engine 124, a replay engine 126, a customization engine 128, a User Interface ("UI") engine 130, and/or other instructions 132 that program computer system 110 to perform various operations, each of which are described in greater detail herein. As used herein, for convenience, the various instructions will be described as performing an operation, when, in fact, the various instructions program the processors 112 (and therefore computer system 110) to perform the operation.

Peripherals 140

Peripherals 140 may be used to obtain an input (e.g., direct input, measured input, etc.) from a player. Peripherals 140 may include, without limitation, a game controller, a gamepad, a keyboard, a mouse, an imaging device such as a camera, a motion sensing device, a light sensor, a biometric sensor, and/or other peripheral device that can obtain an input from a player. Peripherals 140 may be coupled to a corresponding computer system 110 via a wired and/or wireless connection.

Server 150

Server 150 may include one or computing devices. Although not illustrated in FIG. 1, server 150 may include one or more physical processors programmed by computer program instructions. For example, server 150 may include all or a portion of customization application 120 and therefore provide all or a portion of the operations of customization application 120.

Although illustrated in FIG. 1 as a single component, computer system 110 and server 150 may each include a plurality of individual components (e.g., computer devices) each programmed with at least some of the functions described herein. In this manner, some components of computer system 110 and/or server 150 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIG. 1 as being co-located within a single processing unit, in implementations in which processor(s) 112 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

In FIG. 1, as well as in other drawing Figures, different numbers of entities than those depicted may be used. Furthermore, according to various implementations, the components described herein may be implemented in hardware and/or software that configure hardware.

The various databases 160 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The foregoing system architecture is exemplary only and should not be viewed as limiting. Other system configurations may be used as well, as would be appreciated by those having skill in the art.

Exemplary Multiplayer System Configurations

Multiplayer video games have exploded in popularity due, in part, to services such as Microsoft's Xbox LIVE® and Sony's PlayStation Network® which enable gamers all over the world to play with or against one another. Generally, a multiplayer video game is a video game in which two or more players play in a gameplay session in a cooperative or adversarial relationship. Typically, when a player logs in to a game system or platform to play a multiplayer video game, the player may engage in a gameplay session in which he or she is matched with other players to play together (on the same team or as opponents).

Figure 2A:
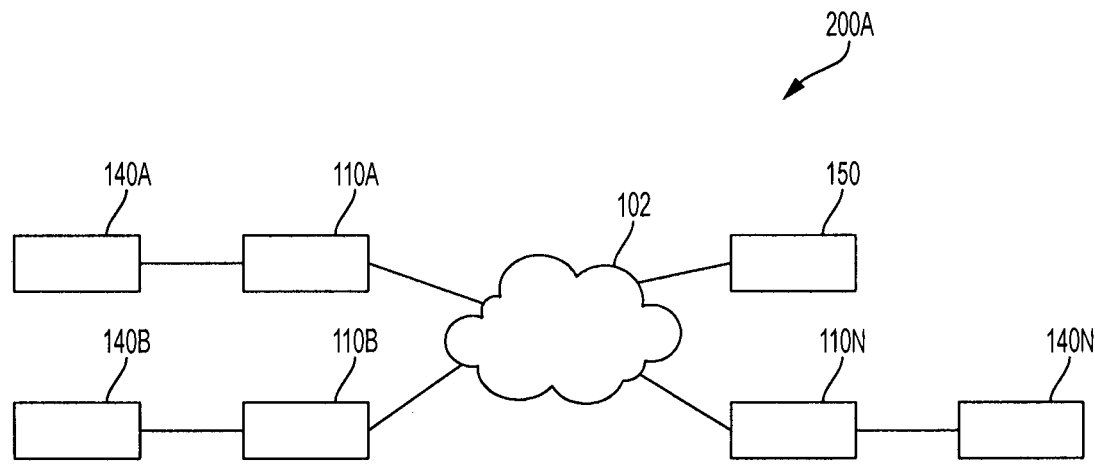
FIG. 2A illustrates an exemplary system configuration in which a server hosts a plurality of computer devices to facilitate a multiplayer game, according to an implementation of the invention.

FIG. 2A illustrates an exemplary system configuration 200A in which a server hosts a plurality of computer devices to facilitate a multiplayer game, according to an implementation of the invention. In one implementation, one or more servers 150 may host a number of computer systems 110 (illustrated as computer systems 110A, 110B, . . . , 110N) via a network 102. Each computer system 110 may include one or more peripherals (illustrated as peripherals 140A, 140B, . . . , 140N). In this manner, one or more servers 150 may facilitate the gameplay of different players using different computer systems 110 and/or otherwise provide one or more operations of customization application 120 (illustrated in FIG. 1).

In some instances, a given server 150 may be associated with a proprietary gameplay network system, such as, without limitation, Microsoft's Xbox LIVE® and Sony's PlayStation Network®, and/or another type of gameplay network system. In this implementation, a given computer system 110 may be associated with a particular type of gaming console. Other types of computer systems 110 using other types of gameplay networks may be used as well.

Figure 2B:
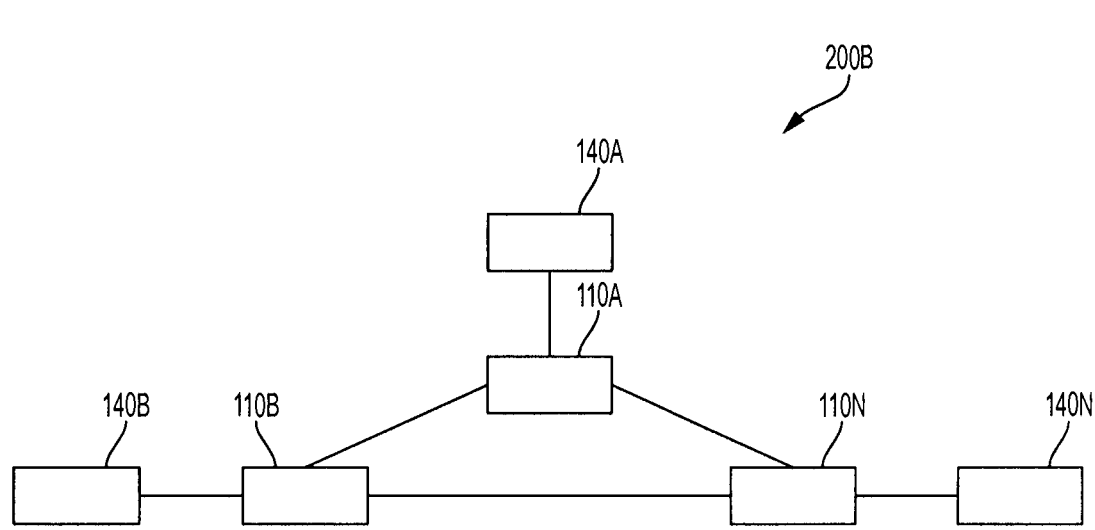
FIG. 2B illustrates an exemplary system configuration in which a plurality of networked servers communicate with one another to facilitate a multiplayer game, according to an implementation of the invention.

FIG. 2B illustrates an exemplary system configuration 200B in which a plurality of computer systems 110 are networked together to facilitate a multiplayer game, according to an implementation of the invention. Any one or more of the computer devices 110 may serve as a host and/or otherwise provide one or more operations of customization application 120 (illustrated in FIG. 1).

Figure 2C:
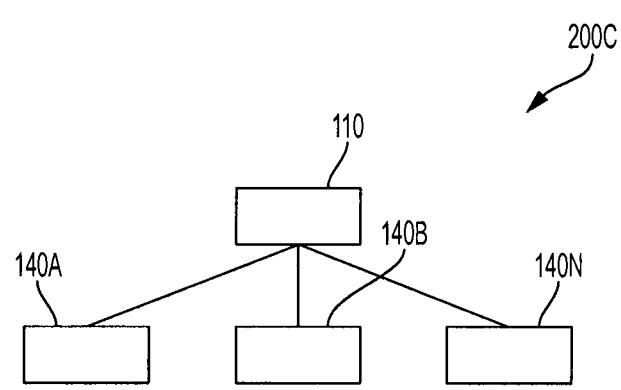
FIG. 2C illustrates an exemplary system configuration in which a plurality of computer devices are networked together to facilitate a multiplayer game, according to an implementation of the invention.

FIG. 2C illustrates an exemplary system configuration 200C in which a computer system 110 is used by a plurality of users to facilitate a multiplayer game, according to an implementation of the invention. In an implementation, computer system 110 may be considered to host the multiplayer game and/or otherwise provide one or more operations of customization application 120 (illustrated in FIG. 1).

Referring to FIGS. 2A-2C, in an implementation, a host may facilitate the multiplayer game and/or perform other operations described herein. In an implementation, at least some of these operations may also or instead be performed by an individual computer system 110. Furthermore, the illustrated system configurations are exemplary only and should not be viewed as limiting in any way. Other system configurations may be used as well, as would be appreciated by those having skill in the art.

As previously noted, while aspects of the invention may be described with reference to multiplayer video games, it should be recognized that the features and functionality described herein are equally applicable to a single player video game.

Gameplay Session

In one implementation of the invention, in a multiplayer mode, matchmaking engine 122 may use known or hereafter developed matchmaking techniques to generate a match (e.g., interchangeably referred to herein as engaging in "matchmaking") between two or more players (e.g., one or more human players and/or one or more non-player characters). The match, if accepted by the matched players, may result in initiation of a gameplay session that includes the matched players.

According to an aspect of the invention, during gameplay, event log engine 124 may record gameplay state information. The gameplay state information may include user commands (e.g., click, touch, button presses, other inputs, etc.) and associated timing information of the commands for one or more players, audio/video information, positions and attributes of characters and objects, depiction of surrounding game environment and conditions, and any other type of game state information that may be used to recreate the game state for any given time or period of time of a gameplay session. Event log engine 124 may capture gameplay state information continuously, or in predetermined time segments. The gameplay state information may be stored in one or more databases, such as database 160.

Trigger Events and Trigger Event Detection

In one implementation of the invention, one or more game events may be defined as trigger events. When a trigger event occurs during gameplay, an in-game replay of one or more actions comprising the trigger event may occur as explained in greater detail below.

According to an aspect of the invention, trigger events may be system-defined (e.g., defined by the game logic) or user-defined (e.g., through one or more user interfaces prior to the commencement of a gameplay session). It should be appreciated that trigger events may be different for different video games. As an example, in a shooter game, a trigger event may comprise a kill in a match, or a last kill in any match, among other examples. In a game of capture the flag, for instance, a trigger event may include a kill in the match, a flag capture, a flag defend, a final flag capture or kill in a match, or other game event.

According to an aspect of the invention, gameplay may be monitored in real-time for the detection of a trigger event (e.g., by event log engine 124, or other game logic). When a trigger event is detected, a replay of the one or more game actions comprising the trigger event may be generated.

In some instances, two or more trigger events may occur during gameplay (and be detected) at substantially the same time. For example, a final kill in a match may occur at the same time that a flag is captured. In these situations, one or more of the trigger events may be replayed. For example, in one implementation, the most significant trigger event, as defined by game logic or a user, may be replayed. Alternatively, each trigger event may be replayed in an order of significance ascribed to the trigger event by game logic or by a user. As yet another example, each trigger event may be replayed simultaneously, each in its own window generated on the game's user interface (e.g., 2 windows may be generated on the user interface for replaying each of 2 trigger events). Other configurations may be implemented.

Trigger Event Replay

According to an aspect of the invention, when a trigger event is detected, replay engine 126 may generate a replay of one or more of the game actions comprising the trigger event. In particular, replay engine 126 may retrieve gameplay state information associated with the trigger event recorded by event log engine 124.

As described herein, the replay of a trigger event comprises a playback of the actions comprising the trigger event, by replay engine 126, based on the gameplay state information retrieved from event log engine 124. In other words, the retrieved gameplay state information (e.g., user inputs, character movements and actions, positions and attributes of other characters and objects, depiction of surrounding game environment and conditions, and other captured gameplay state information) is used by replay engine 126 to generate (or recreate) the one or more actions and associated game state information for the trigger event.

In one implementation, gameplay state information may be retrieved from event log engine 124 for a predetermined time period that includes the trigger event, as well as a period of time before and/or after the trigger event. For example, if a final kill in a match takes 3 seconds, replay engine may retrieve 20 seconds of gameplay state information prior to the final kill (e.g., to capture actions leading up to the final kill such as a chase, etc.), the 3 seconds associated with the final kill, and an additional 5 seconds after the kill (e.g., to capture the aftermath), for a total of 28 seconds. The predetermined time periods may vary depending on the nature of the trigger event, and may be defined by game logic and/or by users via one or more user interfaces (e.g., generated via UI engine 130).

In an alternative implementation, gameplay state information may be retrieved from event log engine 124 relevant to a predetermined number of game actions that occurred prior to, and are associated with, the trigger event. For example, if a trigger event comprises a final kill in a match, the replay engine may retrieve gameplay state information for a predetermined number of predefined prior game actions including, for instance, identification of the enemy combatant, aiming of the weapon, and pulling of the trigger. Gameplay state information representing the final kill may also be retrieved along with gameplay state information for one or more actions occurring after the trigger event (e.g., the character raising his or her arms in victory, etc.). The predetermined number of associated game actions (for retrieval) occurring before, during, and/or after the trigger event may vary depending on the nature of the trigger event, and may be defined by game logic and/or by users via one or more user interfaces (e.g., generated via UI engine 130).

According to an aspect of the invention, a trigger event may be replayed for a player that caused the trigger event, for a player affected by the trigger event, and/or a number of other players that may have witnessed or were otherwise associated with the trigger event. A trigger event may also be replayed to depict a number of different player perspectives of the trigger event. As a non-limiting example, when a player is killed in a first person shooter multiplayer video game, a trigger event replay may show the player his or her death from the perspective of the killer. The trigger event replay may also be provided to one or more players participating in the gameplay session. For example, if one or more players were killed by a grenade in a first person shooter multiplayer video game, all of the players killed may be shown the trigger event replay from the perspective of the player that threw the grenade.

In one implementation, gameplay may be paused while the trigger event is replayed. In an alternative implementation, gameplay may continue while the trigger event is replayed and the one or more players that view the replay may rejoin the game in-progress after the trigger event has been replayed. In some implementations, the trigger event may be replayed in a pop-up window or other on-screen display mechanism so as not to disrupt gameplay. In other implementations, the trigger event may be replayed on the full screen. In other words, a trigger event may be replayed to one or more players, in various screen displays (e.g., full screen, partial screen, in a separate window, etc.), from one or more different perspectives, while gameplay is either paused or allowed to continue. Various configurations may be implemented.

Replay Customization

According to an aspect of the invention, replay of a trigger event may be customized in a variety of ways via customization engine 128. For example, and as described in greater detail below, graphical content, message content (e.g., text-based messages), audio content, video content, advertising content, and other types of customization content may be added to a replay of a trigger event to customize the replay.

In one implementation, customization engine 128 may apply customization content to a playback (by replay engine 126) of a trigger event using system-defined customization templates and/or user-defined customization templates created using a customization interface (described in detail below). The customization content available for any given trigger event may depend on a variety of factors including the video game, the type of game event that constitutes the trigger event, the intended audience for the trigger event replay, the perspective(s) from which replay of the trigger event may be viewed, and/or other factors.

As an example, in a shooter game where a trigger event comprises the death of a player, the trigger event replay may show a player his or her death from the perspective of the killer. As such, each player may be provided with an option to select one or more system-defined customization templates (including customization content) that will be added to the trigger event replay shown to opponents that he kills during gameplay (that is, when he is the killer). Each player may also be given the option of creating one or more individual (or personalized) customization templates that include customization content that will be added to the trigger event replay shown to opponents that he kills. For example, PLAYER A may be mean-spirited or aggressive, and therefore wish to taunt other game players that he kills when they view the replay of their death at his hands.

Accordingly, PLAYER A may create a customization template with customization content including one or more of a message (e.g., "I got you good!"), audio content (e.g., sound of a soldier laughing), video content, graphical content, or other customization content. Further, PLAYER A may create multiple customization templates to be used depending on a variety of factors including the identify of an opponent he kills in the game (e.g., friends versus strangers in a multiplayer game), the weapon that he uses to kill an opponent (e.g., a gun versus a grenade), the number of other game players that will see the trigger event replay (e.g., a more personalized message if he kills one player, or a different, more generic message if he kills multiple players), or other factors.

According to an aspect of the invention, a player may select a system-defined customization template for one or more trigger events from a user interface prior to commencing gameplay. A player may further generate user-defined customization templates via a customization interface described in detail below. If no customization templates are selected or created, a default customization template may be applied when a trigger event is detected, or no customization content may be added to a trigger event replay.

Graphical Content

According to an aspect of the invention, customization engine 128 enables graphical customization content to be added to a trigger event replay. Any type of graphics may be utilized. For example, in one implementation, a user may select graphics from a library of graphics stored in database 160. Users may also import graphics. In one implementation, users may also edit graphics by, for example, adding objects to a graphic, deleting objects in a graphic, changing the color, shade, size, shape and contrast in a graphic, or otherwise changing the appearance of a graphic.

Message Content

According to an aspect of the invention, customization engine 128 enables message customization content (e.g., text-based messages) to be added to a trigger event replay. Users may create customized messages in any color and style with various fonts, font sizes, and colors. Users may also select messages from a library of messages stored in database 160.

Audio Content

According to an aspect of the invention, customization engine 128 enables audio customization content to be added to a trigger event replay. For example, in one implementation, a user may select (e.g., sounds, songs, snippets of songs, etc.) from a library of audio clips stored in database 160. Users may also import audio clips. Further, customization engine 128 may also comprise an audio editor tool that enables editing of audio clips. The audio editor tool may further enable editing of the audio associated with the retrieved gameplay state information associated with the trigger event recorded by event log engine 124.

Video Content

According to an aspect of the invention, customization engine 128 enables video customization content to be added to a trigger event replay. For example, in one implementation, a user may select video clips from a library of video clips stored in database 160. Users may also import video clips. Additionally, customization engine 128 may further comprise a video editor tool that enables editing of video clips.

The video editor tool may further enable editing of the video associated with the retrieved gameplay state information associated with the trigger event recorded by event log engine 124. For example, the video editor tool may enable edits including deleting, adding, inserting, a file insertion, an advertisement insertion, blending, blanking, fading, appearing (opposite of fading), a layover, a contrast, a brightness, a color, an appearance, a shading, a focus, a sharpen, a transform, a graininess, an erase, a cut, cut frames, a paste, pasting frames, painting, patterning, airbrushing, a crop, a copy, adding text, adding audio, a rotate, an annotation, inversion, or the like.

Advertising Content

In some implementations, customization engine 128 may enable advertising content to be added to a trigger event replay. For example, third-party advertisements may be inserted into a trigger event replay as a way to generate additional revenue for the game publisher.

In yet another example, to drive in-game purchases, certain gameplay items may be accentuated in a trigger event replay. As an example, if a player is killed by an opponent that has a superior weapon, the trigger event replay may include additional text or audio highlighting the benefits, strength, advantages, etc. of the weapon as a way to encourage the killed player to make game-related purchases of the weapon possessed by the opponent that killed them.

System-defined customization templates and user-defined customization templates may be stored in database 160 for retrieval and application when a trigger event is detected. If a single customization template is selected or created by the user for a trigger event, or if game logic permits only one customization template to be applied during a trigger event replay (regardless of whether it is a system-selected or user-defined template), the template may be applied automatically and the trigger event replay may occur automatically when the trigger event is detected. As previously noted, if no customization templates are selected or created, a default customization template may be applied when a trigger event is detected, or no customization content may be added to a trigger event replay.

In certain implementations, a player may assign two or more customization templates (e.g., system-selected and/or user-defined templates) as being applicable to a given trigger event. For instance, in the shooter example noted above, a player may create multiple customization templates to be used for a kill trigger event depending on a variety of factors including who he kills in the game, the weapon that he uses to kill another player, the number of other game players that will see the trigger event replay, or other factors. In this implementation, each customization template may be assigned (by customization engine 128) to a particular input used for gameplay (e.g., a controller button, mouse click, certain motion-based input, etc.). Accordingly, when a trigger event occurs, a player may be provided with an opportunity to activate the input corresponding to whatever customization template he or she wishes to apply in that moment based on the gameplay. For example, if PLAYER A kills a known friend that happens to be an opponent in a multiplayer game, he may select the button corresponding to a user-defined customization template that is perhaps more personalized in nature and includes more taunting since he knows his opponent. On the other hand, if PLAYER A kills an opponent that he does not know, he may select the button corresponding to a system-defined customization template that is more generic and not as personal (or harsh).

In those instances where a player may select from among multiple customization templates to apply to a trigger event replay, gameplay may pause for a predetermined time after the trigger event occurs to provide the player with an opportunity to select the input corresponding to the desired customization template. If no customization template is selected during this predetermined time period, a default customization template may be applied, or no customization content may be added to a trigger event replay. In another implementation, gameplay may continue while the customization template is selected by the player, and the trigger event is replayed. The one or more players that view the replay may rejoin the game in-progress after the trigger event has been replayed.

EXAMPLE

Figure 3:
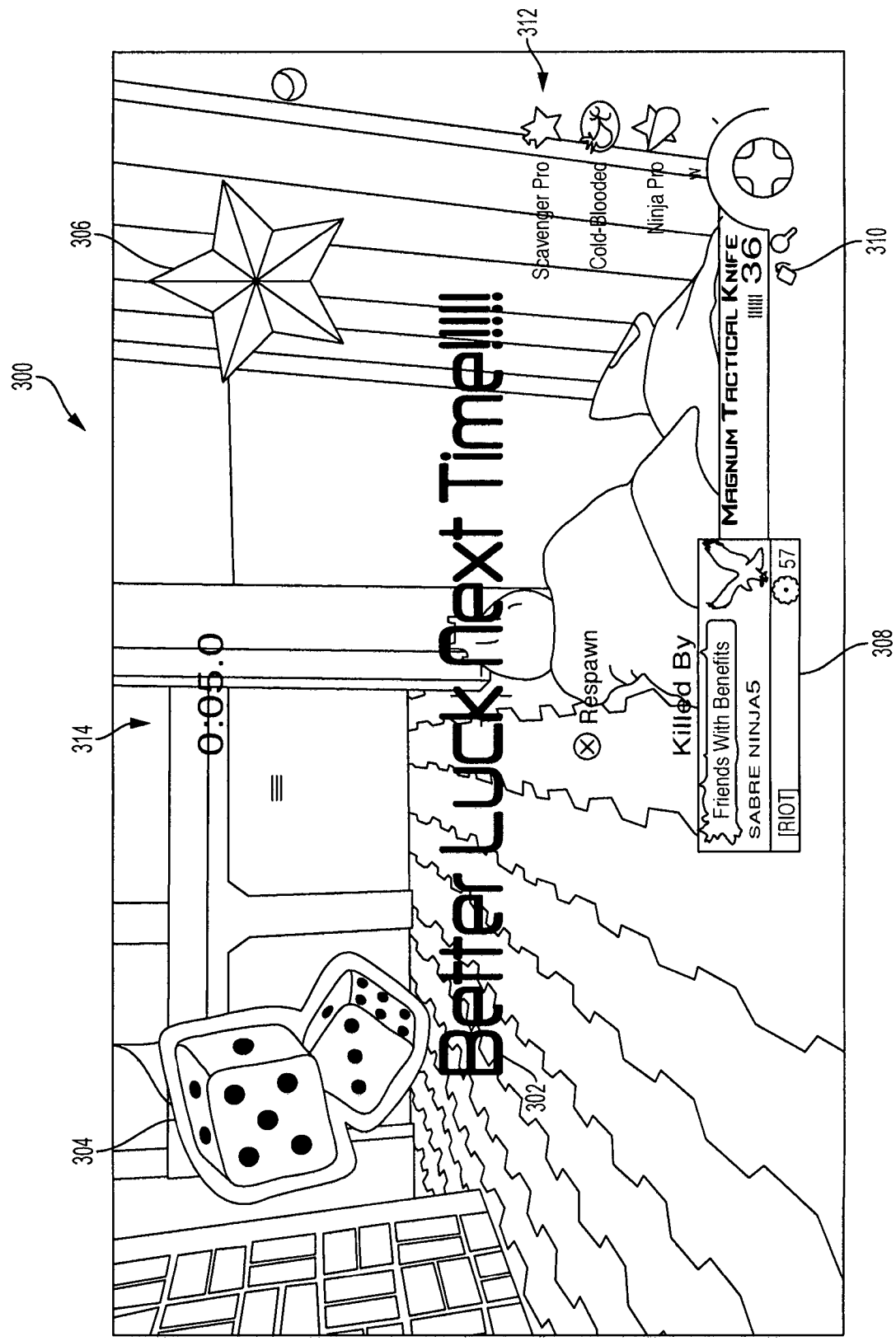
FIG. 3 illustrates an exemplary screenshot of a replay of a game event in a video game, according to an implementation of the invention.

FIG. 3 depicts an exemplary screenshot capture 300 of a trigger event replay for a shooter game that includes customization content, according to an implementation of the invention. In this example, a player that has been killed by an enemy combatant is viewing the replay of his or her death from the perspective of the shooter. The customization content that is applied to the trigger event replay by customization engine 128 includes a graphic 304 depicting fuzzy dice, a graphic 306 depicting a general's star, and a text-based message 302 that recites "Better Luck Next Time!!!!!"

Continuing with the example in FIG. 3, customization content may further include information relating to (or associated with) one or more actions comprising the trigger event that is the subject of the replay. For example, the identity or screen name 308 of the player responsible for the trigger event (the shooter in this example) may be displayed. Player attributes or associated characteristics of the player responsible for the trigger event may also be displayed, such as, for example, information about the player's weapon load out 310, perks or skills 312, and the like.

In yet another example, a trigger event replay may include a display of a timer 314 that counts down to the actual trigger event (in this instance the shooting death of the player). Again, a trigger event replay may include a number of actions comprising the trigger event. A countdown timer (or other indicator) may display the time remaining as the various actions (e.g., identification of the enemy combatant, aiming of the weapon, and pulling of the trigger) are replayed leading up to the until the substantially final action of the trigger event occurs (the bullet hitting and killing the player).

As set forth above, graphical content, message content (e.g., text-based messages), audio content, video content, and advertising content are all non-limiting examples of customization content that may be added to a replay of a trigger event (via system-selected and/or user-defined customization templates) to customize the replay.

Customization Interface

Figure 4:
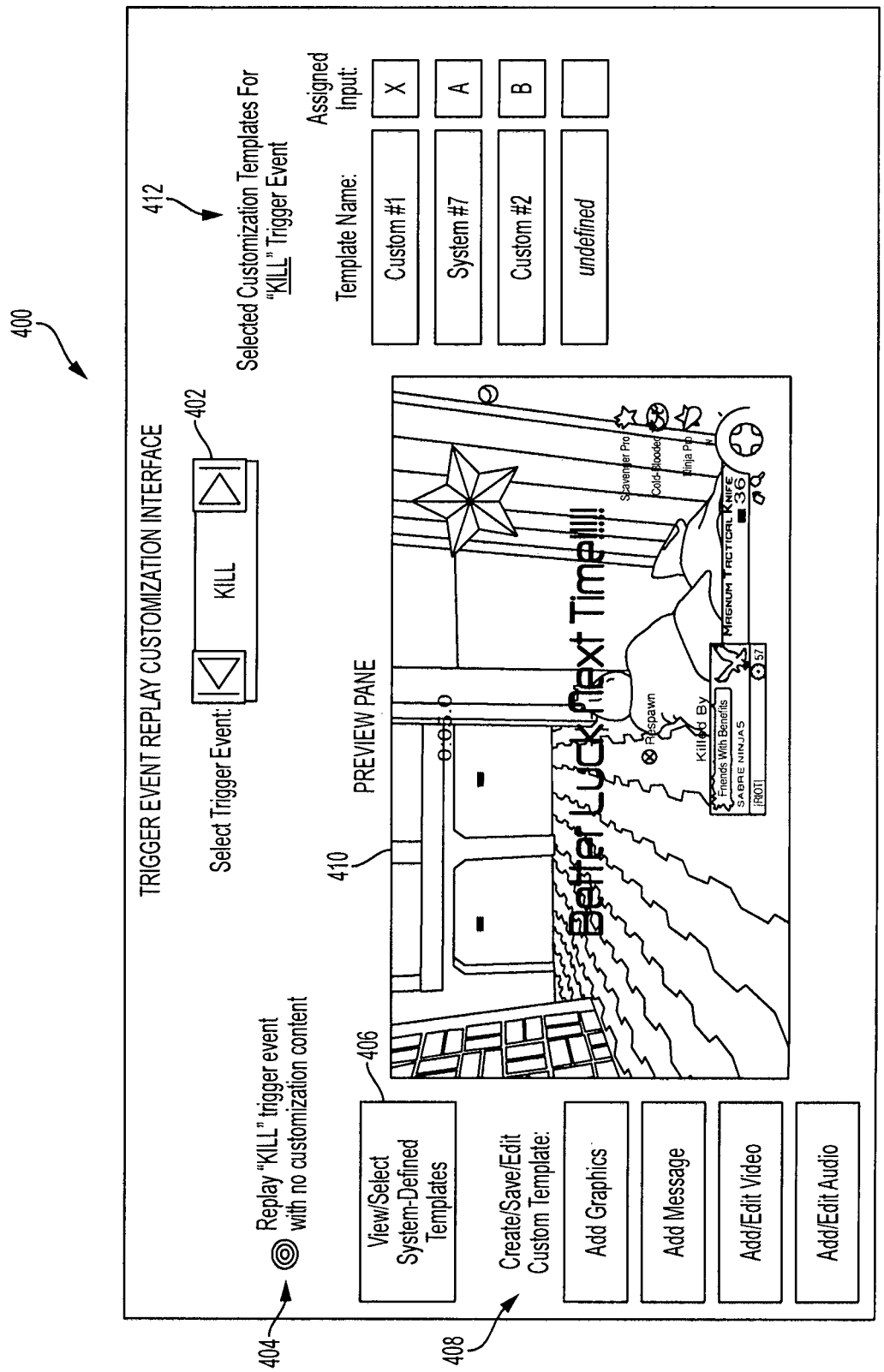
FIG. 4 illustrates an exemplary customization interface for customizing a replay of one or more game events in a video game, according to an implementation of the invention.

FIG. 4 depicts an example of a customization interface 400 (generated by customization engine 128) for customizing a trigger event replay, according to an implementation of the invention. Customization interface 400 may be accessed via a user profile, or one or more other user interfaces (e.g., generated via UI engine 130). Interface 400 depicts various navigational tools that enable users to select, access, display, or navigate through the features and functionality of the customization interface, including selection objects (or buttons), drop-down menus, and the like. The layout of interface 400 is exemplary in nature, and should not be viewed as limiting.

In one implementation, using trigger event interface object 402, a user accessing customization interface 400 may scroll through a list of one or more game events that may be defined as trigger event for the particular game. As previously noted, trigger events may be system-defined (e.g., defined by the game logic) or user-defined (e.g., through one or more user interfaces prior to the commencement of a gameplay session). It should be appreciated that trigger events may be different for different video games.

When a particular trigger event is selected, such as the "KILL" trigger event in this example, a user may make a number of selections regarding the appearance of a trigger event replay of a kill during gameplay. For example, if the player does not wish to add any customization content to a trigger event replay, he or she may indicate as such (e.g., through selection of interface object 404). In this event, when a trigger event is detected during gameplay, no customization content may be added to a trigger event replay.

A user may view, browse, and select one or more system-defined customization templates via selection of interface object 406. Additionally, or in the alternative, a user may generate one or more user-defined customization templates for a trigger event (e.g., the KILL event), via a suite of tools, shown here in display portion 408. These tools may enable a user to add graphical content, message content (e.g., text-based messages), audio content, video content, and other types of customization content to a replay of a trigger event to customize the replay.

Generation of user-defined customization templates may be implemented using known or hereafter-developed layering techniques (or other customization techniques), as would be appreciated by one having ordinary skill in the art.

Preview pane 410 may display previews of both system-defined and user-generated customization templates. Previews may comprise a static image, series of images, or an animation or video clip.

In one implementation, display portion 412 may list a summary of the various customization templates that have been selected or created for the selected trigger event (e.g., the "KILL" trigger event) along with the (controller) inputs that have been mapped to each for selection during gameplay. Depending on the video game, the nature of the trigger event, or other factors, one or more customization templates may be possible. As shown in the exemplary display portion 412 of FIG. 4, a user has assigned 3 different customization templates (out of a possible total of 4) to the "KILL" trigger event. Particularly, the user has created two different custom templates (e.g., "custom #1," and "custom #2") and selected one system-defined customization template (e.g., "system #7") for potential use. In one implementation, each customization template may be assigned (by customization engine 128) to a particular input used for gameplay (e.g., a controller button, mouse click, certain motion-based input, etc.). A user may also select which inputs will correspond to which customization templates. Accordingly, when a trigger event occurs, a player may be provided with an opportunity to activate the input corresponding to whatever customization template he or she wishes to apply in that moment based on the gameplay.

Exemplary Flowchart

Figure 5:
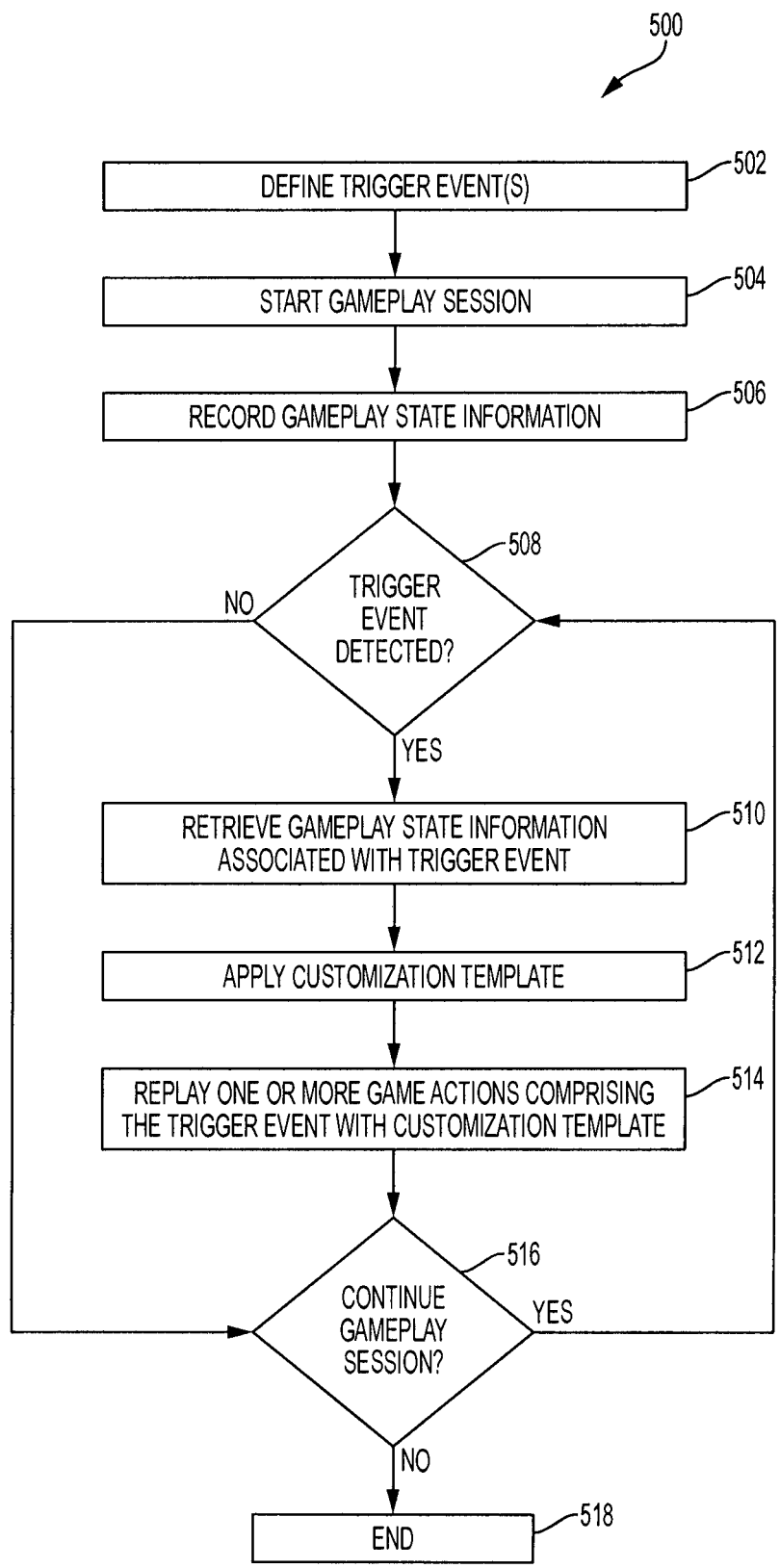
FIG. 5 illustrates a process of customizing a replay of one or more game events in a video game, according to an implementation of the invention.

FIG. 5 depicts a process 500 of customizing a trigger event replay, according to an implementation of the invention. The various processing operations and/or data flows depicted in FIG. 5 are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 502, one or more trigger events may be defined. Trigger events may be system-defined (e.g., defined by the game logic) or user-defined (e.g., through one or more user interfaces prior to the commencement of a gameplay session). It should be appreciated that trigger events may be different for different video games.

In an operation 504, a gameplay session may commence.

In an operation 506, gameplay state information may be recorded during gameplay. The gameplay state information may include user commands (e.g., click, touch, button presses, other inputs, etc.) and associated timing information of the commands for one or more players, audio/video information, positions and attributes of characters and objects, depiction of surrounding game environment and conditions, and any other type of game state information that may be used to recreate the game state for any given time or period of time of a gameplay session. The gameplay state information may be captured (e.g., by an event log engine) continuously, or in predetermined time segments. The gameplay state information may be stored in one or more databases.

In an operation 508, gameplay may be monitored to determine whether a trigger event is detected.

Upon detection of a trigger event, in an operation 510, gameplay state information may be retrieved (e.g., from an event log engine) for a predetermined time period that includes the trigger event, as well as a period of time before and/or after the trigger event. The predetermined time periods may vary depending on the nature of the trigger event, and may be defined by game logic and/or by users via one or more user interfaces.

In an alternative implementation, gameplay state information may be retrieved (e.g., from an event log engine) relevant to a predetermined number of game actions that occurred prior to, and are associated with, the trigger event. The predetermined number of associated game actions (for retrieval) occurring before, during, and/or after the trigger event may vary depending on the nature of the trigger event, and may be defined by game logic and/or by users via one or more user interfaces.

In an operation 512, a customization template may be applied. System-defined customization templates and user-defined customization templates may be stored for retrieval and application when a trigger event is detected. If a single customization template is selected or created by the user for a trigger event, or if game logic permits only one customization template to be applied during a trigger event replay (regardless of whether it is a system-selected or user-defined template), the template may be applied automatically and the trigger event replay may occur automatically when the trigger event is detected.

In those instances where a player may select from among multiple customization templates to apply to a trigger event replay, gameplay may pause for a predetermined time after the trigger event occurs to provide the player with an opportunity to select the input corresponding to the desired customization template. If no customization template is selected during this predetermined time period, a default customization template may be applied, or no customization content may be added to a trigger event replay. In another implementation, gameplay may continue while the customization template is selected by the player, and the trigger event is replayed. The one or more players that view the replay may rejoin the game in-progress after the trigger event has been replayed.

As previously noted, if no customization templates are selected or created, a default customization template may be applied when a trigger event is detected, or no customization content may be added to a trigger event replay.

In an operation 514, one or more game actions comprising the trigger event may be replayed with the customization template. In one implementation, a replay engine may generate a replay of one or more of the game actions comprising the trigger event. The replay of a trigger event comprises a playback of the actions comprising the trigger event based on retrieved gameplay state information (e.g., retrieved from an event log engine). The retrieved gameplay state information (e.g., user inputs, character movements and actions, positions and attributes of other characters and objects, depiction of surrounding game environment and conditions, and other captured gameplay state information) is used to generate (or recreate) the one or more actions and associated game state information for the trigger event.

In an operation 516, a determination may be made as to whether the gameplay session should continue. Upon determining that the gameplay session should continue, processing may resume at operation 508. Otherwise processing may end at operation 518.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method of customizing a replay of one or more game events in a video game being played between at least a first player and a second player, wherein the replay comprises video information, the method being implemented in a computer system having one or more physical processors programmed with computer program instructions that, when executed by the one or more physical processors, cause the computer system to perform the method, wherein the computer system is remote from, and in data communication with, a plurality of computing devices and wherein each of the plurality of computing devices is configured to execute the video game, the method comprising:

defining, by the computer system, one or more game events as trigger events in the video game, wherein the trigger events are audio and/or visual occurrences that occur within, and during the course of playing, the video game and are defined by programmatic logic of the video game;

recording, by the computer system, gameplay state information associated with a gameplay session of the video game, wherein the gameplay state information is stored in one or more databases remote from the plurality of computing devices and comprises at least one of user commands, associated timing information of the user commands, character movements and actions, positions and attributes of characters and objects, or depictions of a surrounding game environment and wherein each of the at least one of user commands, associated timing information of the user commands, character movements and actions, positions and attributes of characters and objects, and depictions of a surrounding game environment is stored separate from the video information of the replay;

using an event log engine in the video game, detecting the occurrence of a trigger event of the trigger events during the gameplay session;

retrieving the recorded gameplay state information for a predetermined time period that includes the trigger event;

generating, by the computer system, the replay, wherein the replay is a visual and/or auditory replay of the trigger event that is taken from a point of view of the second player and wherein the video information of the replay is recreated using the retrieved recorded gameplay state information, for the first time, after the trigger event;

customizing, by the computer system, the replay of the trigger event by:

receiving, via a controller input, a selection of one of a number of customization templates available for the trigger event, wherein each available customization template for the trigger event is mapped to a different controller input, and wherein the controller input comprises one of a video game controller, a peripheral device, or a motion-based input detection device;

applying the selected customization template to the replay to thereby cause at least one of graphics, text, audio, or video to be visually and/or auditorily added to the replay; and applying a default customization template to the replay if no selection is received within a predetermined time period after occurrence of the trigger event; and displaying, by the computer system, the customized replay of the trigger event to the first player in the gameplay session of the video game.

2. The method of claim 1, wherein the gameplay state information is recorded either continuously or in predetermined time segments during the gameplay session of the video game.

3. The method of claim 1, wherein generating the replay further comprises:

retrieving recorded gameplay state information for a predetermined number of game actions that occurred prior to, during, and after the trigger event; and recreating the game actions based on the retrieved recorded gameplay state information.

4. The method of claim 1, wherein generating the replay further comprises:

retrieving recorded gameplay state information for a predetermined time period, wherein the predetermined time period spans a period of time before and after the trigger event; and recreating game actions that occurred during the predetermined time period based on the retrieved recorded gameplay state information.

5. The method of claim 1, wherein customizing the replay further comprises:

applying a customization template to the replay, the customization template comprising one or more of graphical customization content, message customization content, audio customization content, or video customization content, wherein application of the customization template causes at least one of graphics, text, audio, or video to be visually and/or auditorily added to the replay.

6. The method of claim 5, wherein the customization template comprises a user-defined customization template.

7. The method of claim 1, wherein displaying the customized replay further comprises:

pausing the gameplay session for the second player while the customized replay is displayed to the first player.

8. The method of claim 7, further comprising:

allowing the gameplay session to continue for the second player for which the customized replay is not displayed; and allowing the first player that has viewed the customized replay to rejoin the gameplay session in progress after viewing the customized replay.

9. The method of claim 1, wherein displaying the customized replay further comprises:

displaying the customized replay to the first player in an on-screen window while the gameplay session continues.

10. A system for customizing a replay of one or more game events in a video game being played by at least a first user and a second user, wherein the replay comprises video information and wherein the system comprises a computer system that is remote from, and in data communication with, a plurality of computing devices and wherein each of the plurality of computing devices is configured to execute the video game, the system comprising:

one or more physical processors programmed with one or more computer program instructions which, when executed, cause the one or more physical processors to:

define one or more game events as trigger events in the video game, wherein the trigger events are audio and/or visual occurrences that occur within, and during the course of playing, the video game and are defined by programmatic logic of the video game;

record and store gameplay state information associated with a gameplay session of the video game, wherein the gameplay state information is stored in one or more databases remote from the plurality of computing devices and comprises at least one of user commands, associated timing information of the user commands, character movements and actions, positions and attributes of characters and objects, or depictions of a surrounding game environment, and wherein each of the at least one of user commands, associated timing information of the user commands, character movements and actions, positions and attributes of characters and objects, and depictions of a surrounding game environment is stored distinct from the video information of the replay;

using an event log engine in the video game, detect the occurrence of a trigger event of the trigger events during the gameplay session;

retrieve the recorded gameplay state information for a predetermined time period that includes the trigger event;

automatically generate the replay, wherein the replay is a visual and/or auditory replay of the trigger event from a point of view of the second player and wherein the video information of the replay is recreated using the retrieved recorded gameplay state information, for the first time, and is based on detecting the occurrence of the trigger event;

customize the replay by:

receiving, via a controller input, a selection of one of a number of customization templates available for the trigger event, wherein the controller input comprises one of a video game controller, a peripheral device, or a motion-based input detection device;

applying the selected customization template to the replay to thereby cause at least one of graphics, text, audio, or video to be visually and/or auditorily added to the replay; and applying a default customization template to the replay if no selection is received within a predetermined time period after occurrence of the trigger event; and display the customized replay to the first player in the gameplay session of the video game.

11. The system of claim 10, wherein the gameplay state information is recorded either continuously or in predetermined time segments during the gameplay session of the video game.

12. The system of claim 10, wherein, to generate the replay, the one or more physical processors are further caused to:

retrieve recorded gameplay state information for a predetermined number of game actions that occurred prior to, during, and after the trigger event; and recreate the game actions based on the retrieved recorded gameplay state information.

13. The system of claim 10, wherein, to generate the replay, the one or more physical processors are further caused to:

retrieve recorded gameplay state information for a predetermined time period that spans a period of time before and after the trigger event; and recreate game actions that occurred during the predetermined time period based on the retrieved recorded gameplay state information.

14. The system of claim 10, wherein, to customize the replay, the one or more physical processors are further caused to:

apply a customization template to the replay, the customization template comprising one or more of graphical customization content, message customization content, audio customization content, or video customization content, wherein application of the customization template causes at least one of graphics, text, audio, or video to be visually and/or auditorily added to the replay.

15. The system of claim 14, wherein the customization template comprises a user-defined customization template.

16. The system of claim 10, wherein, to display the customized replay, the one or more physical processors are further caused to:

pause the gameplay session for the second player while the customized replay is displayed to the first player.

17. The system of claim 16, wherein the one or more physical processors are further caused to:

allow the gameplay session to continue for the second player for which the customized replay is not displayed; and allow the first player that has the customized replay to rejoin the gameplay session in progress after viewing the customized replay.

18. The system of claim 10, wherein, to display the customized replay, the one or more physical processors are further caused to:

display the customized-replay to the first player in an on-screen window while the gameplay session continues.

19. A computer program product for customizing a replay of one or more game events in a video game being played between a first player and a second player, wherein the replay comprises video information and wherein the computer program product comprises one or more tangible, non-transitory computer-readable storage devices that are remote from, and in data communication with, a plurality of computing devices and wherein each of the plurality of computing devices is configured to execute the video game, the computer program product further comprising:

program instructions, stored on at least one of the one or more tangible, non-transitory computer-readable tangible storage devices that, when executed, cause a computer to:

define one or more game events as trigger events in the video game, wherein the trigger events are audio and/or visual occurrences that occur within, and during the course of playing, the video game and are defined by programmatic logic of the video game;

record and store gameplay state information associated with a gameplay session of the video game, wherein the gameplay state information is stored in one or more databases remote from the plurality of computing devices and comprises at least one of user commands, associated timing information of the user commands, character movements and actions, positions and attributes of characters and objects, or depictions of a surrounding game environment, and wherein each of the at least one of user commands, associated timing information of the user commands, character movements and actions, positions and attributes of characters and objects, and depictions of a surrounding game environment is stored distinct from the video information of the replay;

using an event log engine in the video game, detect the occurrence of a trigger event of the trigger events during the gameplay session;

retrieve the recorded gameplay state information for a predetermined time period that includes the trigger event;

automatically generate the replay, wherein the replay is a visual and/or auditory replay of the trigger event from a point of view of the second player and wherein the video information of the replay is recreated using the retrieved recorded gameplay state information, for the first time, and is based on detecting the occurrence of the trigger event;

customize the replay by:

receiving, via a controller input, a selection of one of a number of customization templates available for the trigger event, wherein the controller input comprises one of a video game controller, a peripheral device, or a motion-based input detection device;

applying the selected customization template to the replay to thereby cause at least one of graphics, text, audio, or video to be visually and/or auditorily added to the replay; and applying a default customization template to the replay if no selection is received within a predetermined time period after occurrence of the trigger event; and display the customized replay to the first player in the gameplay session of the video game.

* * * * *